J. R. BEARD.
SYSTEM FOR SUPPLYING ELECTRIC POWER FOR LIGHTING PURPOSES FROM LOW FREQUENCY POWER CIRCUITS.
APPLICATION FILED APR. 15, 1920.

1,363,707.  Patented Dec. 28, 1920.

WITNESSES
O. B. Buchanan
R. J. Fitzgerald

INVENTOR
James Robert Beard
BY Wesley G. Carr
ATTORNEY

UNITED STATES PATENT OFFICE.

JAMES ROBERT BEARD, OF BENTON, ENGLAND.

SYSTEM FOR SUPPLYING ELECTRIC POWER FOR LIGHTING PURPOSES FROM LOW-FREQUENCY POWER-CIRCUITS.

1,363,707. Specification of Letters Patent. Patented Dec. 28, 1920.

Application filed April 15, 1920. Serial No. 374,197.

*To all whom it may concern:*

Be it known that I, JAMES ROBERT BEARD, a subject of the King of England, and residing at Benton, county of Northumberland, England, have invented certain new and useful Improvements in Systems for Supplying Electric Power for Lighting Purposes from Low-Frequency Power-Circuits, of which the following is a specification.

This invention relates to systems for supplying electric energy for lighting purposes from low frequency power circuits and has particular reference to the supply of electric energy in a form suitable for lighting from low frequency multi-phase power supply networks.

For many purposes such as the supply to traction rotary converters and alternating current railways a relatively low frequency, such as 25 periods per second, presents important advantages.

On the other hand, either arc or incandescent lighting is unsatisfactory at frequencies much lower than 40 periods per second owing to visible flickering of the light.

For reasons of economy in capital cost and operation charges, it is very desirable that all the requirements of an area should be dealt with by a uniform system of generating plant and mains network.

So called "polycyclic" schemes have been suggested whereby multi-phase relatively low frequency currents for power purposes and single-phase higher frequency currents for lighting purposes can be transmitted over the same mains. In this way economy can be secured by the use of the same mains network for both lighting and power purposes, but special single-phase generating plant must be provided of sufficient capacity to deal with the whole lighting load, and special transformers must be employed for separating out the high frequency current at all points where it is desired to use this for lighting purposes.

According to the present invention the main portion of the energy utilized for producing light is generated and distributed at low frequency, and high frequency currents of relatively small magnitude are superimposed on to the low frequency currents in such a way that the wave form of the resultant current in the lighting circuits is modified so as to avoid noticeable flicker. Thus, for instance, if the wave form of the currents in the low frequency circuits approximates to a sine curve the resultant wave form of the currents through the lamps may be a relatively flat topped square shaped wave of the same frequency in which the rate of change of the current from positive to negative and vice versa is equivalent to that of a sine wave of higher frequency than the main frequency of the supply. As a consequence the interval of darkness normally producing the visible flicker may be reduced sufficiently to remove the impression of flicker on the eye.

Any suitable arrangements may be provided whereby the modified wave form can be restricted, in the case of multi-phase systems, to the currents flowing from one or all of the phases to the neutral so that the currents flowing directly between phases will have their original wave form.

One way of doing this is to introduce the higher frequency current at some point in the neutral conductor so that it flows equally in both magnitude and phase through the phase conductors.

The effects of the higher frequency may thus be restricted to the single-phase lighting circuits so as not to react on any of the multi-phase apparatus whether in generating or sub-stations or on the consumer's premises.

The apparatus for producing the relatively small magnitude higher frequency currents may consist, for example, of special modifications in the normal low frequency generating plant or of separate higher frequency generators driven synchronously with the main low frequency generators, or of static frequency converters the correct phase relationship being arranged for in each case. In the latter two cases this higher frequency apparatus may be installed either on the circuit to an individual lighting consumer or to a group of consumers or alternatively may be adjacent to the main source of supply to the whole distribution network. The capacity of this higher frequency apparatus will normally be only a relatively small proportion of the capacity of the lighting load which is to be supplied.

In one application of the invention to the particular case of three-phase, four wire distribution for power and lighting at say 25 periods with 400 volts between phases, the three-phase supply from the generating or sub-station is given from interconnected star generators or transformers with interconnected star secondaries, or alternatively it may be taken as three-phase, three wire and an artificial neutral point formed in a usual manner such as by means of a three-phase interconnected star choking coil or by a three-phase transformer with its primary windings star connected and its secondary windings mesh connected; this artificial neutral being connected to the fourth wire of the local distribution network. Adjacent to the neutral connection a source of single phase power at about 37 volts, 75 periods and of a capacity about one seventh part of the total lighting supplies is connected in series with the fourth wire. This single-phase source may conveniently be a small motor generator set composed of a three-phase, 400 volt, 25 period, synchronous motor, and a single-phase 37 volt, 75 period, generator, the two being so coupled that the two periodicities maintain the correct relative location to produce a resultant symmetrical flat topped wave of voltage or current, between each phase and the fourth wire. Such a distribution network will give a perfectly normal supply to such apparatus as 400 volt three-phase or single-phase motors and will also give a supply of 260 volt lamps with no more tendency to flicker than is visible with the same lamps at 40 periods.

In the accompanying drawings.

Figure 1:
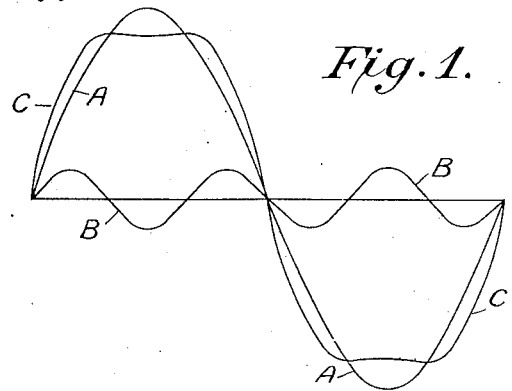
Figure 1 is a wave form diagram.

With reference first to Fig. 1 the curve A indicates the wave form of the low frequency current of the main power circuit. The curve B represents the higher frequency currents of relatively small magnitude, and the curve C shows the modified wave form of the resultant current in the lighting circuit. It will be seen that whereas the intervals between the peaks of the curve A if the frequency were say 25 per second, would produce an appreciable flicker if the current were applied for lighting purposes, the flat topped curve C produced by the imposition of the higher frequency current is of such a nature that there will be no noticeable flicker in the light.

Figure 2:
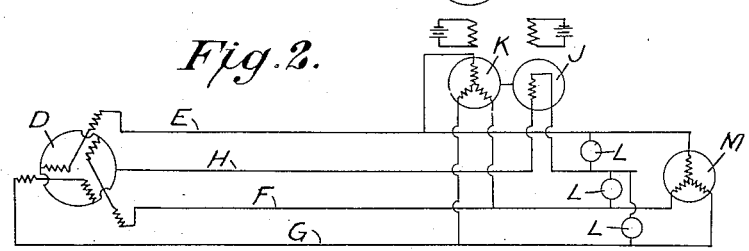
Fig. 2 is a diagram illustrating one method of carrying out the invention as applied to a three-phase four wire distribution system.

Fig. 2 shows by way of example one method of applying the invention to a three-phase four wire distribution system the low frequency interconnected star three-phase generator being represented at D, the phase conductors at E, F, and G and the neutral conductor at H. At some convenient point in the neutral H a single phase generator J is connected, driven by a synchronous three-phase motor K connected across the phase conductors E, F and G. The arrangement is such that currents of the desired high frequency, equal in magnitude and phase, are imposed on the phase conductors, and lamps L connected as shown between the neutral H and the several phase conductors E, F and G will receive a current having the required modified wave form. Moreover the effects of the higher frequency currents are by this arrangement confined to the single phase lighting circuits and do not react on any multi-phase apparatus such for example as the three-phase motor M which receives current of the original low frequency and wave form, as the interconnected-star connection of the generator D forms a relatively low-impedance path for phase-to-neutral, triple-frequency currents.

Figure 3:
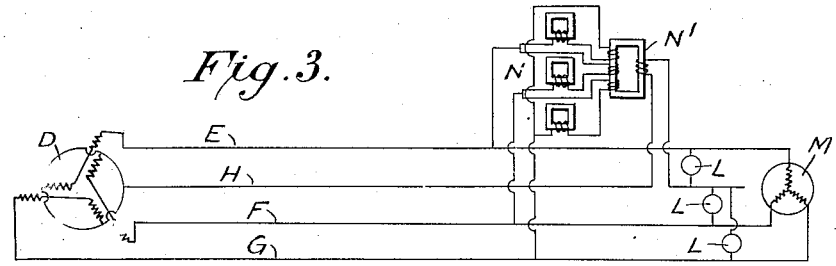
Fig. 3 illustrates another method also in connection with a three-phase four wire distribution system.

Fig. 3 illustrates another method of carrying out the invention by the employment of a static frequency converter N having one set of its windings connected across the phase conductors E, F and G and a secondary winding N' in series with the neutral H. This arrangement so far as its effect on the system is concerned, is similar to that described with reference to Fig. 2 the static frequency converter taking the place of the synchronous motor driven single phase generator J.

Figure 4:
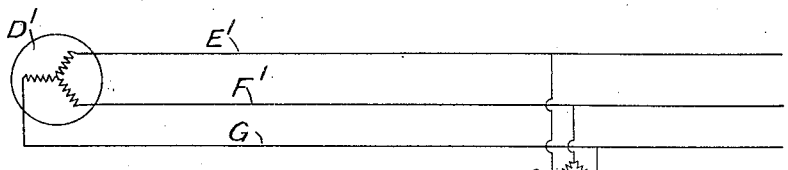
Fig. 4 shows diagrammatically one arrangement of apparatus for carrying out the invention as employed on a consumer's circuit.

Fig. 4 shows one way in which the invention may be carried out by apparatus installed in the consumer's circuit instead of in the main distribution system. In this diagram D' is a three-phase generator supplying low frequency current to a network represented by the three-phase conductors E', F' and G'. At a point in the network where current for lighting or lighting and power is required, a three-phase step down transformer O is installed. The secondary windings of this transformer are shown interconnected star connected and arranged to supply energy to phase conductors E², F² and G² and a neutral conductor H'. Across the phase conductors E², F² and G² a static frequency converter N² is connected having its secondary winding N³ in series with the neutral conductor N'. The lamps L' are connected between the neutral and the respective phase conductors E², F² and G² and receive current of modified wave form just as in the arrangements described with reference to Figs. 2 and 3. Low voltage three-phase current at the low frequency for power may be obtained from the phase conductors $E^2$, $F^2$ and $G^2$ as for instance by a three-phase motor $M'$.

In addition to the possibility of operating lights from low-frequency power circuits, my system possesses an additional advantage owing to the fact that the peak values of the phase-to-neutral potentials on the three phase-conductors are reduced. This is very desirable for reducing corona losses. Moreover, my system is well adapted for alternating-current arc welding, as the arc is more easily sustained on flat-topped voltage wave forms, such as described, provided too much reactance is not used.

While I have illustrated my invention in several different forms, I desire it to be understood that modifications may be made therein by those skilled in the art without departing from the spirit and scope of my invention as defined in the appended claims.

What I claim as my invention and desire to secure by Letters Patent is:

1. The combination with a low-frequency, three-phase, four-wire distribution system of the class wherein the electromotive forces of the phase-to-phase circuits have a wave form suitable for power loads but unsuited for lighting loads, and wherein the electromotive forces of the phase-to-neutral circuits contain the third harmonic in addition to the fundamental, of a power load connected to said phase-to-phase circuits, and a lighting load connected to said phase-to-neutral circuits.

2. In an alternating-current system of distribution, the combination of a power load requiring a certain wave form of current, a main source of low-frequency, polyphase, alternating-current energy supplying currents of a wave form suited to said power load, phase conductors connected to said main source and to said power load, means for deriving a neutral conductor from said main source, a lighting load requiring currents of wave forms producing a briefer interruption of power at the end of each half cycle, said lighting load being connected in phase-to-neutral circuit relation with said phase conductors and said neutral conductor, an auxiliary source of relatively high-frequency, alternating-current energy in series-circuit relationship with said phase-to-neutral lighting load, and means for forming a low-impedance neutral-to-phase path for currents from said auxiliary source, said auxiliary source being of a capacity equal to only a portion of said lighting load.

3. In a system for supplying electric current and electric energy in a form suitable for lighting from low-frequency power circuits, the combination with a three-phase source of energy supplying current at low frequency to a four-wire distribution system, the phase-to-neutral branches within said source being so connected as to offer slight impedance to currents impressed from an external source, of an auxiliary source of energy of higher frequency in series with the neutral conductor and acting to modify the wave form of the current between each phase conductor and the neutral for the purpose described.

4. In a system for supplying electric energy in a form suitable for lighting from low-frequency power circuits, the combination with a three-phase interconnected star source of energy supplying current at low frequency to a four-wire distribution system, the phase-to-neutral circuits offering slight impedance to current impressed from an external source, of an auxiliary source of energy of higher frequency in series with the neutral conductor and acting to modify the wave form of the current between each phase conductor and the neutral for the purpose described.

5. The combination with a low-frequency, three-phase, four-wire distribution system of the class wherein the electromotive force of the phase-to-phase circuits have a wave form suitable for power loads but unsuited for lighting loads and wherein the electromotive force of the phase-to-neutral circuits contain the third harmonic in addition to the fundamental, of a load connected to said phase-to-phase circuits, and a load operating at maximum efficiency with a substantially square topped wave connected to said phase-to-neutral circuits.

6. The combination with a low-frequency polyphase power-load circuit which is unsuited for lighting loads, of means for deriving a neutral therefrom adapted to supply a phase-to-neutral lighting load, means for generating a harmonic in the neutral of such an order that the phase-to-phase currents of the power load are substantially unmodified in wave form but that the phase-to-neutral currents have a modified wave form suited for lighting loads, and a lighting load in the phase-to-neutral circuit.

In witness whereof I have signed my name to this specification.

JAMES ROBERT BEARD.